Patented Nov. 8, 1949

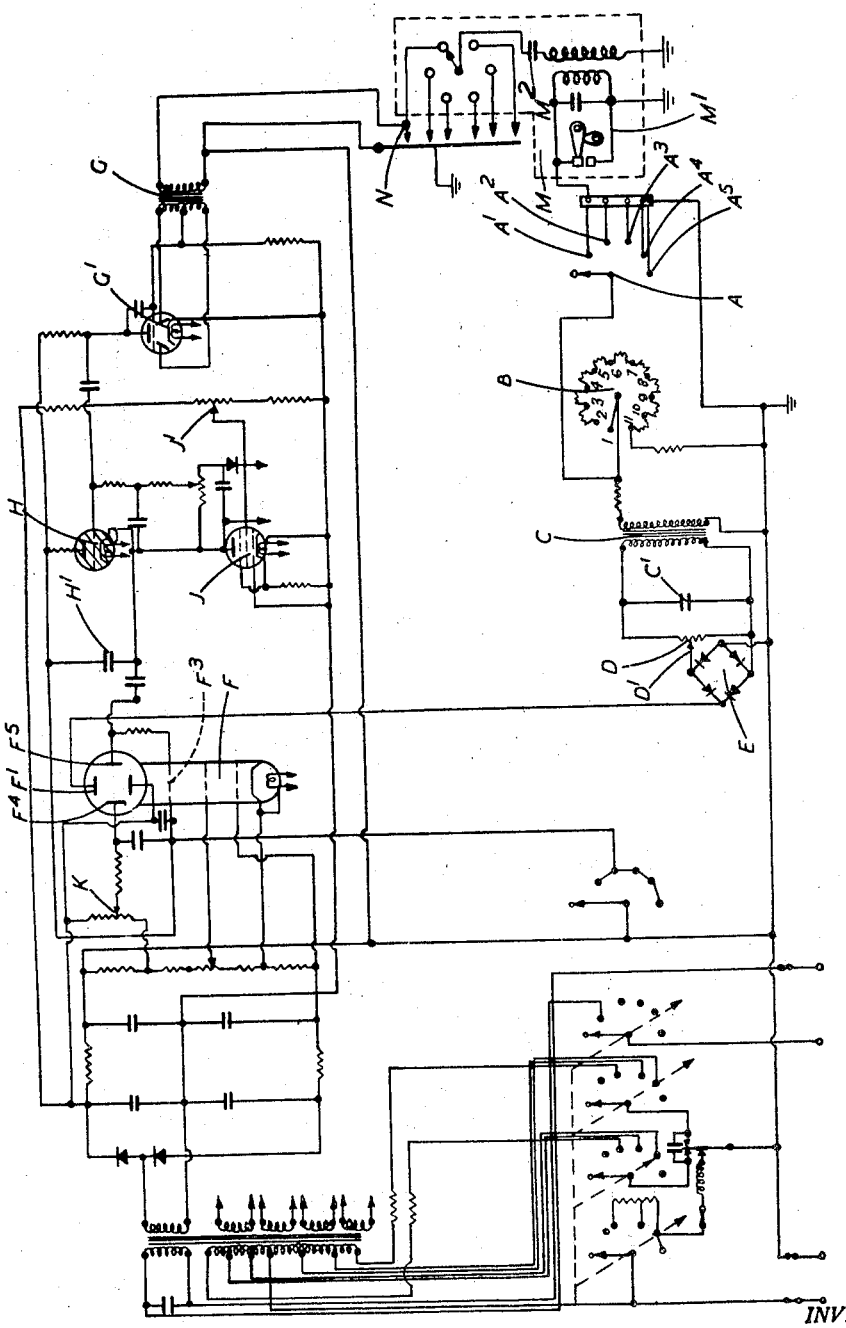

2,487,071

UNITED STATES PATENT OFFICE 2,487,071

APPARATUS FOR TESTING IGNITION SYSTEMS FOR INTERNAL-COMBUSTION ENGINES

Frank Raymond Faber Ramsay, London, England, assignor to D. Napier & Son Limited, London, England, a company of Great Britain Application November 22, 1946, Serial No. 711,502
In Great Britain October 15, 1946

10 Claims. (Cl. 175—183)

This invention relates to apparatus for testing the ignition systems of internal combustion engines of the kind including an oscillograph, means for connecting the oscillograph to the low tension part of the ignition apparatus so as to receive impulses and give indications representing the impulses delivered to the sparking plugs, and means for synchronising the time base of the oscillograph with the cycle of the engine so that figures representing the impulses for a series of sparking plugs are produced by the trace in sequence on the screen of the cathode ray tube or its equivalent.

For convenience the circuit of the apparatus which is adapted to be connected to the low tension part of the ignition system will hereinafter be called the input circuit.

It has been proposed in the testing apparatus of the above kind described in the specification of the present applicant's United States Patent No. 2,450,164 to provide in the input circuit means, hereinafter called an attenuator, whereby the voltage of the impulses delivered to the sparking plugs can be progressively reduced so as to enable the condition of the sparking plugs either as a whole or in relation to one another to be more readily and fully investigated. Thus by use of such an attenuator not only can the plugs be caused successively to fail to spark, but the visual indications provided in the figures of faults present in the plugs or their circuits can be accentuated, thus facilitating the tracing and diagnosis of such faults.

Further, in the specification of the present applicant, United States patent application Serial No. 655,975, certain improvements to such apparatus have been proposed, including a full wave rectifier in the input circuit, which causes all impulses whether of the same or opposite polarity to produce deflections of the trace in the same direction from the datum line so that all the individual impulse figures appear on the same side of this line, and such improvements are also applicable to apparatus according to the present invention.

While the attenuator as described in the specification of United States Patent No. 2,450,164 which comprises a variable resistance, performs its function satisfactorily when the apparatus is used with magneto or other ignition systems of the kind usually employed on engines for motor vehicles or marine purposes, and in many cases for aircraft wherein no condenser is provided in series with the high tension circuit, it is found that certain faults cannot be adequately investigated and traced when such a condenser is used, as in certain magnetos for aircraft engines where it serves the purpose of improving the altitude performance of the ignition system since the high impedance presented by the condenser between the high tension winding and the sparking plugs masks the effect of plug defects on the form of the figures produced by the trace. Thus where such a condenser is incorporated while the testing apparatus will usually give some indication of an open circuited plug and of contact breaker faults, it gives little, or no, indication of short circuited or bridged plugs since the impedance of the condenser is so high that the magneto or coil exerts substantially its full voltage irrespective of plug condition.

The object of the present invention is to reduce or eliminate this difficulty and provide an improved testing apparatus of the kind referred to which will enable ignition systems embodying a condenser in the high tension circuit to be investigated substantially as readily and effectively as systems not embodying such a condenser.

To this end according to the present invention, apparatus of the kind referred to for testing ignition systems includes in the input circuit an attenuator comprising a variable inductance whereby the voltage of the spark impulses delivered to the sparking plugs can be progressively reduced so as to cause the plugs successively to fail to spark.

In this way it is found that the primary voltage wave form can be so altered as to show up and exaggerate the effect on that wave form of plug defects so that by using a suitably graded variable inductance plug faults can be readily detected and diagnosed whether the ignition system includes a series condenser in the high tension circuit or not.

Conveniently, the variable inductance constituting the attenuator is arranged so that when the apparatus is connected to the ignition system, the variable inductance is in parallel with the low tension winding of the magneto or coil.

As stated, the invention can be applied to apparatus as described in the specification of the present applicant's United States Patent No. 2,450,164 either with or without the improvement described in the specification of the present applicant's United States patent application Serial No. 655,975, but one arrangement according to the invention is illustrated diagrammatically by way of example in the accompanying drawing as embodied in apparatus also embodying the invention forming the subject of patent application Serial No. 655,975.

In the arrangement illustrated the apparatus includes a selector switch A having a number of contacts $A^1$, $A^2$, $A^3$, $A^4$, $A^5$ which may be connected to the low tension circuits $M^1$ of a number of magnetos or coil ignition units M, only one of which is shown in the drawing, i. e. to the low tension circuits of four or more magnetos embodied in the dual ignition apparatus of an aircraft engine. Thus, the apparatus can either be connected to the circuit of a single magneto or coil which it is desired to test or may be connected through the selector switch to the various magneto circuits so that they can readily be tested in turn.

Shunted across the primary winding of the magneto or ignition coil selected is a variable inductance B having a number of tappings indicated by the reference numerals 1 to 11 and giving in a particular example inductance values in millihenrys of say respectively infinity 14, 8, 6, 4.5, 3.2, 2.9, 2.5, 2.2, 1.75 and 1.38 mh. It will thus be seen that by progressively varying the value of the inductance B the impulses delivered to the sparking plugs can be progressively reduced or attenuated.

Also connected across the primary winding of the selected magneto or ignition coil is the primary winding of a transformer C, the secondary winding of which is shunted by a condenser $C^1$ of say 0.05 mfd. and a potentiometer D, the purpose of which is to vary the amplitude of the trace given on the screen of the oscillograph.

These components also serve as a filter circuit to remove high frequency loops and peaks which would otherwise render the interpretation of the trace and identification of faults therefrom difficult or impossible. This filter circuit also selectively distorts the wave form so as to exaggerate the effect of the ignition faults upon the wave form.

The potentiometer tapping $D^1$ is connected through a full wave metal oxide rectifier E to one of the vertical deflecting plates $F^1$ of a cathode ray tube F whereof the anode $F^3$ is connected to earth.

From a chosen one of the sparking plugs N a triggering impulse is tapped off to trigger the time base of the oscillograph. This impulse is fed in to the primary winding of a transformer G, the circuit including a resistance of some five megohms or a small capacity of some 15-30 microfarads shunted by a resistance of say 5 megohms as described in the specification of United States Patent No. 2,450,164. In addition as also described in the specification of United States Patent No. 2,450,164 it is preferred that the adaptor by which the triggering impulse is tapped from the sparking plug circuit is arranged to interrupt the lead to the sparking plug by means of a series spark gap to ensure that a triggering impulse is provided even if the particular sparking plug happens to be short-circuited.

The triggering impulse is rectified in order that it may function both with positive and negative spark impulses, any suitable form of rectifier being used, i. e. one comprising a double diode triode $G^1$ of known type, as described in United States Patent No. 2,450,164. Thus, the secondary winding of the transformer G is preferably centre-tapped and has its ends connected respectively to the diodes while the centre tapping is connected to the grid and through resistances to the cathode, thereby passing the rectified impulse to the grid.

As in United States Patent No. 2,450,164 the particular form of time base circuit per se forms no part of the present invention and only the main features thereof have therefore been described with reference to the drawing.

The amplified impulse from the double diode triode $G^1$ is passed to the grid of a grid-controlled argon filled relay valve H of the type known as a G. T. I. C. and causes this valve to conduct provided the impulse is sufficiently in excess of the permanent grid bias on the gas relay valve. Across the anode circuit of this gas relay valve is a condenser $H^1$ of about 0.1 microfarad which is consequently discharged whereupon the fall of anode voltage causes the gas relay valve to become non-conductive again.

The condenser $H^1$ is connected across the high tension supply through a pentode J, the voltage variation across the condenser $H^1$ being applied to the horizontal deflector plates $F^4$, $F^5$ of the cathode ray tube F to form the time base. The voltage of the condenser $H^1$ during charging will thus be proportional to time while the discharge through the gas valve H provides the flash-back. The screen voltage of the pentode J is variable by means of a potentiometer $J^1$ to vary the time base.

A potentiometer K is provided whereby a bias can be applied to the plate $F^4$ so as to enable the datum line of the trace to be adjusted so that the first figure in the row of figures occurs at the side of the screen, thus enabling the row of figures to be adjusted to occupy the whole width of the screen.

The apparatus can be connected to any suitable source of power, for example it may be built as a unit including batteries. In the arrangement shown, however, a power supply circuit is provided for supplying the various high tension and filament heating voltage from an input which may be either direct current from batteries, i. e. of 6, 12 or 24 volts or alternating current at 230 volts and 50 cycles.

The arrangement employed for this purpose is similar to that described in the specification of United States Patent No. 2,450,164 and will not therefore be herein further described since in itself it forms no part of the present invention.

In a modification of the invention a mixed attenuator comprising for example a variable resistance and a variable inductance may be used, the two being for example combined and having a single control member which first brings in the resistance and then the inductance.

In any case the inductance may comprise simply a tapped winding on a laminated iron core or, for example a continuously variable inductance consisting of laminated rotor and stator or similar relatively movable elements carrying appropriate windings, the maximum value of the inductance in either case being of the order of 65 millihenrys.

Other examples of apparatus according to the present invention would be apparatus as shown in and described with reference to Figure 1 of the present applicant's United States Patent No. 2,450,164 but with the variable resistance $E^x$ replaced by a variable inductance, and apparatus as shown in and described with reference to Figure 2 of the specification of the present applicant's United States patent application Serial No. 655,975 but with the variable resistance B replaced by a variable inductance.

It is found (as stated) that apparatus embodying an inductance type attenuator according to the invention enables faults in the ignition system to be traced and diagnosed when the apparatus is connected to an ignition system embodying a series condenser $M^2$ in the high tension circuit in the same way as the apparatus forming the subject of United States Patent No. 2,450,164 could be used with systems not incorporating such a condenser. Moreover, apparatus according to the present invention is equally useable with ignition systems not incorporating such a condenser in the high tension circuit and, if, as in the example shown in the drawing accompanying the present specification, the apparatus embodies a rectifier E, in the input circuit, the apparatus can thus be used equally well and to the best advantage for testing ignition systems either with or without a condenser in the high tension circuit and irrespective of whether the ignition system is for an engine having an even or odd number of cylinders.

A further incidental advantage of the present invention is that it does not effect the triggering of the apparatus to the same extent as a resistance type attenuator. This assists diagnosis, especially where a series condenser is used in the high tension circuit, since with the resistance type attenuator certain plug defects do not show up until such an attenuator has reduced the voltage below that at which the apparatus will trigger.

What I claim as my invention and desire to secure by Letters Patent is:

1. Apparatus for testing the ignition systems of internal combustion engines including a cathode ray tube, a time base circuit for said tube, means for triggering the time base from an identifiable point in the cycle of the engine, an input circuit for connecting the tube to the low tension or primary side of the ignition system so as to receive impulses and give indications representing the wave form of a succession if impulses delivered respectively to the several sparking plugs supplied by the ignition apparatus, and attenuating means comprising a variable inductance associated with the input circuit whereby the voltage of the spark impulses delivered to the sparking plugs can be progressively reduced so as to cause the plugs successively to fail to spark.

2. Apparatus for testing the ignition systems of internal combustion engines including a cathode ray tube, a time base circuit for said tube, a circuit for triggering the time base by an electrical impulse corresponding to that supplied to one of the sparking plugs, rectifying means in the circuit of the triggering impulse to ensure that the time base is triggered irrespective of the polarity of the triggering spark impulse, an input circuit for connecting the tube to the low tension or primary side of the ignition system so as to receive impulses and give indications representing the wave form of a succession of impulses delivered respectively to the several sparking plugs supplied by the ignition apparatus, and attenuating means comprising a variable inductance associated with the input circuit whereby the voltage of the spark impulses delivered to the sparking plugs can be progressively reduced so as to cause the plugs successively to fail to spark.

3. Apparatus for testing the ignition systems of internal combustion engines including a cathode ray tube, a time base circuit for said tube, means for triggering the time base from an identifiable point in the cycle of the engine, an input circuit for connecting the tube to the low tension or primary side of the ignition apparatus so as to receive impulses and give indications representing the wave-form of a succession of impulses delivered respectively to the several sparking plugs supplied by the ignition apparatus, filtering means associated with the input circuit to eliminate high frequencies from the cathode ray tube, and attenuating means comprising a variable inductance associated with the input circuit whereby the voltage of the spark impulses delivered to the sparking plugs can be progressively reduced so as to cause the plugs successively to fail to spark.

4. Apparatus for testing the ignition systems of internal combustion engines as claimed in claim 1 in which the attenuating means is in the form of a variable inductance arranged so as to be in parallel with the low tension winding of the ignition coil or magneto when the apparatus is connected to the ignition system.

5. Apparatus for testing the ignition systems of internal combustion engines as claimed in claim 1 in which a full wave rectifier is arranged in the input circuit.

6. Apparatus for testing the ignition systems of internal combustion engines as claimed in claim 3 in which a full wave rectifier is arranged in the input circuit.

7. Apparatus for testing the ignition systems of internal combustion engines including a cathode ray tube, a time base circuit for said tube, a circuit for triggering the time base by an electrical impulse corresponding to that supplied to one of the sparking plugs, rectifying means in the circuit of the triggering impulse to ensure that the time base is triggered irrespective of the polarity of the triggering spark impulse, an input circuit for connecting the tube to the low tension or primary side of the ignition apparatus so as to receive impulses and give indications representing the wave form of a succession of impulses delivered respectively to the several sparking plugs supplied by the ignition apparatus, filtering means associated with the input circuit for filtering out the loops due to high frequency oscillations in the ignition apparatus, a full wave rectifier in the input circuit, and an attenuator comprising a variable inductance associated with the input circuit whereby the voltage of the spark impulses delivered to the sparking plugs can be progressively reduced so as to cause the plugs progressively to fail to spark.

8. Apparatus for testing the ignition systems of internal combustion engines as claimed in claim 1 in which the variable inductance is associated with a variable resistance which can be used in association with the variable inductance to reduce the voltage of the spark impulses.

9. Apparatus for testing the ignition systems of internal combustion engines as claimed in claim 1 in which the variable inductance has associated therewith a variable resistance arranged so as to be brought into operation before the variable inductance when the voltage of the spark impulses is to be progressively reduced.

10. In combination with an ignition system for internal combustion engines having a condenser in series in the secondary circuit thereof, of a testing apparatus for such system, including a cathode ray tube, a time base circuit for such tube, means for triggering the time base circuit from an identifiable point in the cycle of the engine, an input circuit for connecting the tube to the low tension or primary side of the ignition system so as to receive and give indications representing the wave form of a succession of impulses delivered respectively to the several sparking plugs supplied by the ignition apparatus, and attenuating means comprising a variable inductance associated with the input circuit whereby the voltage of the spark impulses delivered to the sparking plugs can be progressively reduced.

FRANK RAYMOND FABER RAMSAY.

REFERENCES CITED

The following references are of record in the file of this patent:

UNITED STATES PATENTS

| Number | Name | Date |
|---|---|---|
| 2,094,472 | Rohats | Sept. 28, 1937 |
| 2,100,702 | Schlesinger | Nov. 30, 1937 |
| 2,178,471 | De Bruin | Oct. 31, 1939 |
| 2,188,845 | Ramsay | Jan. 30, 1940 |
| 2,355,363 | Christaldi | Aug. 8, 1944 |
| 2,366,355 | Roberts | Jan. 2, 1945 |